May 28, 1940.  R. HARDING, JR  2,202,795
MULTIPLE SCANNING SYSTEM
Filed March 12, 1934  3 Sheets-Sheet 2

INVENTOR
ROBERT HARDING JR.
BY
ATTORNEYS

May 28, 1940.   R. HARDING, JR   2,202,795
MULTIPLE SCANNING SYSTEM
Filed March 12, 1934   3 Sheets-Sheet 3

INVENTOR
ROBERT HARDING JR.
BY
Brazelton Whitcomb & Davies
ATTORNEYS

Patented May 28, 1940

2,202,795

UNITED STATES PATENT OFFICE 2,202,795

MULTIPLE SCANNING SYSTEM

Robert Harding, Jr., Elmsford, N. Y., assignor to National Television and Manufacturing Corporation, Wilmington, Del., a corporation of Delaware Application March 12, 1934, Serial No. 715,054

1 Claim. (Cl. 178—7.6)

This invention relates to television receivers and particularly to that type of receiver making use of a helical mirror drum.

One of the objects of the invention is to provide means to position the light source nearer to the drum so as to produce a brighter picture.

Another object of the invention is to provide a television scanning apparatus which will permit the use of a simpler and less expensive motor.

Still another object of the invention is to provide a helical mirror drum with more than one reflecting surface on a given plane.

Other objects of the invention and objects relating to the method of constructing and assembling the various parts will be evident as the description of the invention proceeds.

The invention is illustrated in the accompanying drawings in which.

In the patent to Gardner No. 1,753,697 is shown a helical mirror drum comprising a plurality of rectangular plates mounted one upon the other on a shaft and each plate having one edge polished to form a reflector with the opposite edge and the ends blackened to prevent the reflection of light. These plates are arranged around the shaft with equal angular spacing so that they make one complete rotation around the shaft. Such a drum, if it were provided with 60 plates, for instance, for making a 60 line picture, would have those plates spaced 6° apart around the drum.

One way of using such a drum to obtain excellent results is to rotate the drum on a vertical axis with a linear source of light spaced from it and parallel to it and then observe the image of the light directly in the drum. If the light is modulated in accordance with a television signal and the drum is rotated at the proper speed a picture will be seen by looking directly into the drum as the image of the light source is picked up by one plate after another in succession and is carried across the plate from one end to the other.

Figures 1, 2, 7:
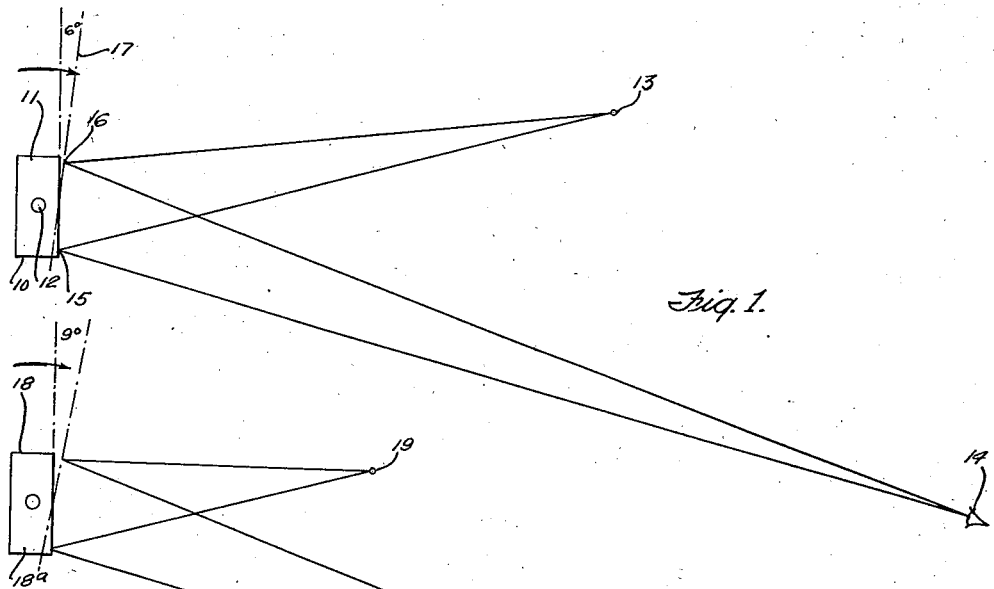
Fig. 1 is a diagrammatical plan view of the known apparatus without the present invention.
Fig. 2 is a diagrammatical plan view of an apparatus incorporating the invention.
Fig. 7 is a view similar to Fig. 2 showing a still further modification of the invention.

Such an arrangement of a drum and light source is shown in Fig. 1 where the drum 10 has a plurality of plates 11 mounted on a shaft 12 at 6° spacing. The light source 13 is positioned at such a distance away from the drum that the television image obtained upon the drum by an observer with his eye positioned at 14 will completely cover the drum.

In other words, the size of the drum, the distance the light is away from the drum, and the distance the observer is from the drum, bear a certain relation to each other and with a given size drum the light source must be placed a certain distance away in order for the image seen by the observer to completely fill the drum. If the light source is moved closer to the drum the image is foreshortened horizontally thus showing a plurality of images each of which is the same height as the drum. If the light source is moved too far away from the drum the picture will increase in width so that the observer will only see a portion of it horizontally.

For a drum six inches in height and having the reflecting edges of the plates 7.2 inches long I have found that the light source should be placed about 48 inches away from the drum in order for the observer to see a complete picture at a distance of 10 feet. If the 6° angle between the starting point and finishing point of the plate, or in other words between the plates, could be increased it would be possible to bring the light source very much nearer to the drum without showing more than one picture horizontally thereof.

The proportions shown in Fig. 1 are somewhat exaggerated but illustrate the principle involved. The plate 11 first picks up the image of the light source at a point 15 at the extreme left edge thereof and then as the drum rotates in a clockwise direction the image of the light source sweeps across the plate until it reaches the point 16 at the extreme right hand edge thereof when the reflecting edge of the plate will lie on the line 17 forming a 6° angle with the position of the plate at the starting point.

If pictures are sent at the rate of twenty per second this means that there will be 1200 pictures per minute and if one picture is formed for each rotation of the drum the speed will be 1200 revolutions per minute. It is desirable in many instances to use a synchronous motor to operate the scanning drum and this motor is maintained at the proper speed by the alternating power source which is also driving the synchronous motor at the sending station. Such a motor would have to be made to run at 1200 R. P. M. but it is simpler to construct and may be smaller for the same power output if the speed is 1800 R. P. M.

I have found that I can increase the angle between the plates for a scanning rate of 20 pictures per second and at the same time run the motor at a speed of 1800 R. P. M. Fig. 2 shows the result of such a change. The drum 18 has plates 18a spaced 9° apart which permits the light source 19 to be positioned nearer the drum as is shown in the drawings. The nearer the light is to the drum the brighter will be the picture produced, as the intensity of the light varies as the square of the distance, so that a large amount of light is gained by this arrangement. But by spacing the plates at 9° instead of 6° the reflecting surfaces will pass once and a half around the drum. Thus with a 60 plate drum No. 41 plate will occupy exactly the same position as No. 1 while No. 60 will have the same position as No. 20. As the drum rotates there will be two reflecting surfaces picking up the light at any given instant, these surfaces being spaced apart a distance of 40 plates. Some means must be provided to pick up the light on only one of these surfaces at a given time and this I may accomplish by a shutter to be later described.

If the reflecting surfaces pass once and a half around the drum it will mean that when the picture has been completely scanned once the reflecting edge of No. 1 plate is away from the observer so that it cannot now pick up the reflection of the light and is not therefore ready to function for the second picture. However, the rear side of the plate is in position and this, according to my invention, is also made reflecting so that it may be used for the second picture similarly to the first mentioned sides of the plates.

Where both sides of the plates are used in this arrangement, when No. 1 plate has its first reflecting surface towards the observer No. 21 plate will have its rear reflecting surface towards the observer and No. 41 plate will have its first reflecting surface towards the observer. It will therefore be necessary to block out No. 21 plate and No. 41 plate so that No. 1 plate only is visible to the observer. This may be accomplished by a suitable shutter which if desired may expose only a few plates at a time to the light source, the remaining plates being shielded therefrom.

Figure 3:
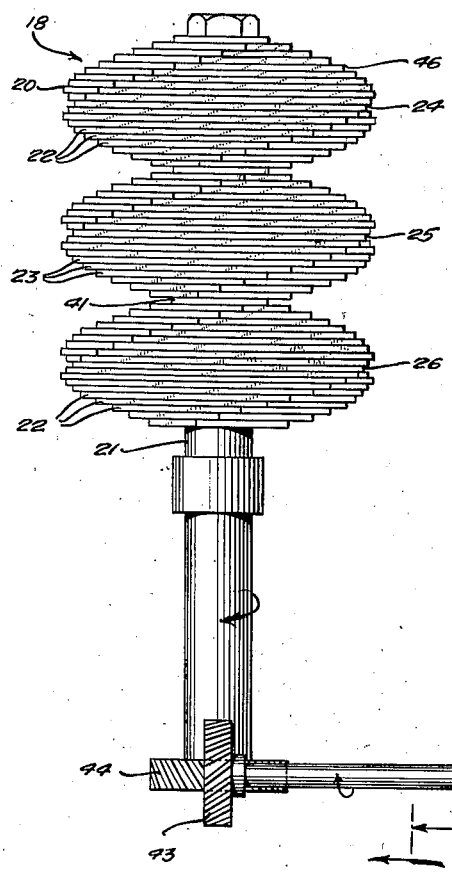
Fig. 3 is an elevational front view of one form of the invention carrying out the arrangement of Fig. 2.
Figure 4:
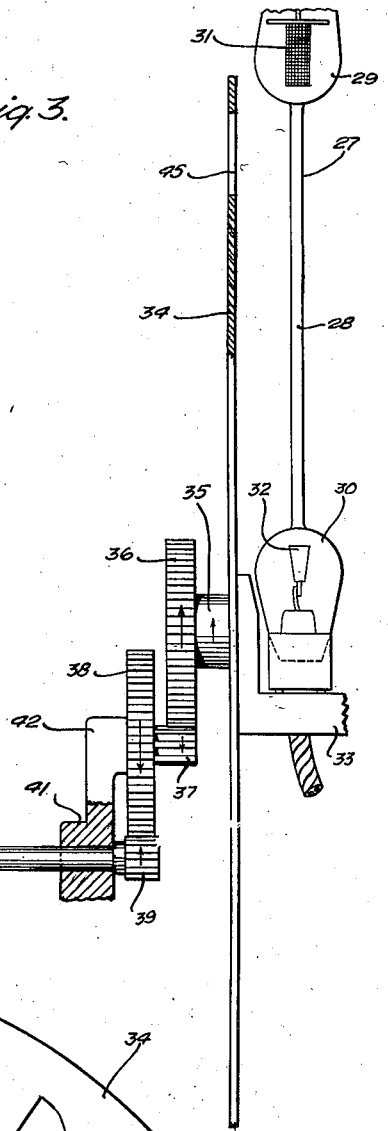
Fig. 4 is a fragmentary elevational side view of a shutter used in the construction of Fig. 3.
Figure 4:
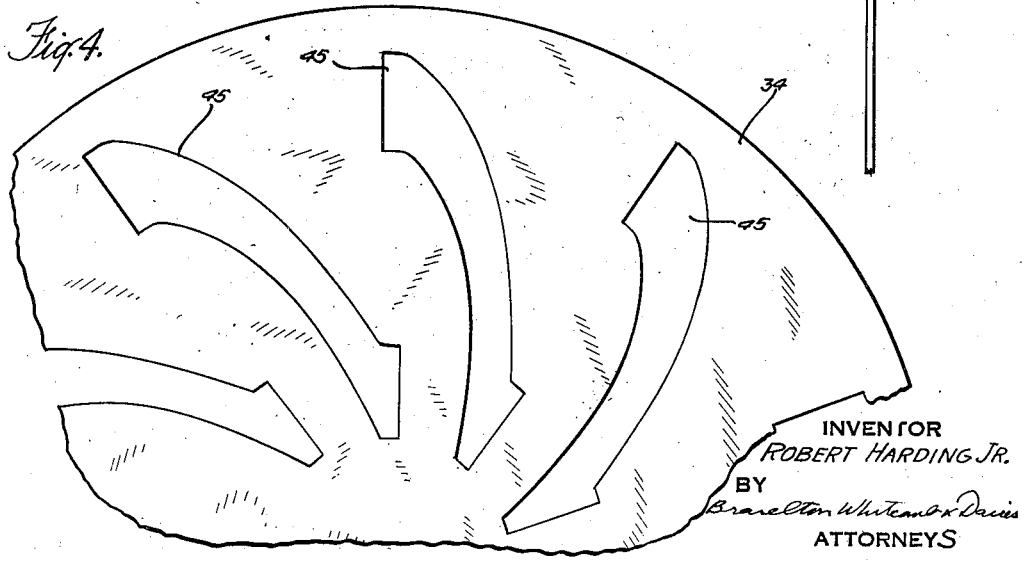

In Fig. 3 a front elevation of the drum 18 is shown. The plates 20 are mounted on a shaft 21 which is driven by a suitable motor not shown. The front surfaces 22 of the plates are reflecting as well as the back surfaces 23 so that the drum has the appearance of a double helix of reflecting surfaces. It will be noted from an inspection of this figure that plate No. 11 indicated at 24, the back reflecting surface of plate No. 31 indicated at 25, and plate No. 51 indicated at 26 are all facing the observer. Thus every 20 plates there is a reflecting surface which would pick up light from the light source providing no shutter were used.

The light source 27 may be any light source arranged to produce a line of light either by optical means or due, as in the present instance, to the contour of the discharge produced. The lamp illustrated in the drawings may be similar to that shown and described in the application of John W. McKay, entitled Television lamp and apparatus, Serial No. 628,321, filed August 11, 1932. This lamp comprises a tubular portion 28 having a length somewhat longer than the height of the drum which is joined to two bulbs 29 and 30, the former housing the cathode 31 of the lamp and the latter the anode 32. The cathode 31 may comprise a relatively large electrode of wire mesh, while the anode 32 may be smaller and may be made of any suitable metal. The lamp may be filled with one of the monatomic gases, such as neon, with the addition of a small quantity of a metal vapor such as mercury. In practice neon gas at about 10 mm. pressure has been used together with a small drop of mercury. Such a lamp may be mounted on a suitable bracket 33 so that the tubular portion 28 lies parallel to the shaft 21 of the drum.

Between the lamp and the drum and preferably adjacent to the lamp I provide a shutter 34 in the form of a disc of metal or other suitable opaque material. This shutter may be rotatably mounted on a shaft 35 to which is attached a gear 36. The gear 36 may mesh with a pinion 37 attached to a gear 38 which in turn meshes with a pinion 39 mounted on a shaft 40. The shaft 40 has a bearing 41 formed in a frame 42 which also provides the bearings for the gears 38 and 36. The shaft 40 extends over to the drum shaft 41 and is provided at its end with a spiral gear 43 which meshes with a spiral gear 44 positioned on the shaft 21 below the drum. Rotation of the drum shaft will cause the disc 34 to rotate but at a much slower speed due to the gear reduction.

The disc 34 is provided with a plurality of inclined slots 45 which extend from a point near the circumference to a point near the center of the disc and have curved outlines depending on the number of slots used and the number of plates desired to cut off from the light. As shown there are 12 slots in the disc and it is desired to have one slot move across the light for each picture. This would make the disc rotate $\frac{1}{12}$ of a revolution for each 1½ turns of the drum. In other words, if the drum is rotating at 1800 R. P. M. the disc will rotate at 100 R. P. M.

As shown with the observer facing the drum light is being picked up on about No. 5 plate indicated at 46 so that the shutter disc is in such position that the slot 45 comes at the upper part of the lamp and permits light radiated from the lamp to be reflected by that plate, while plates No. 25 and No. 45 with reflecting surfaces in the same position as plate No. 5 would receive no light due to the opaque part of the disc cutting it off.

Figure 5:
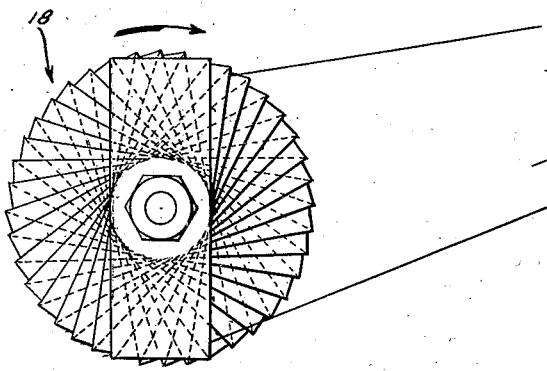
Fig. 5 is a plan view of a modified form of the invention.
Figure 5:
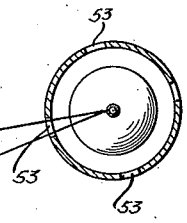
Figure 6:
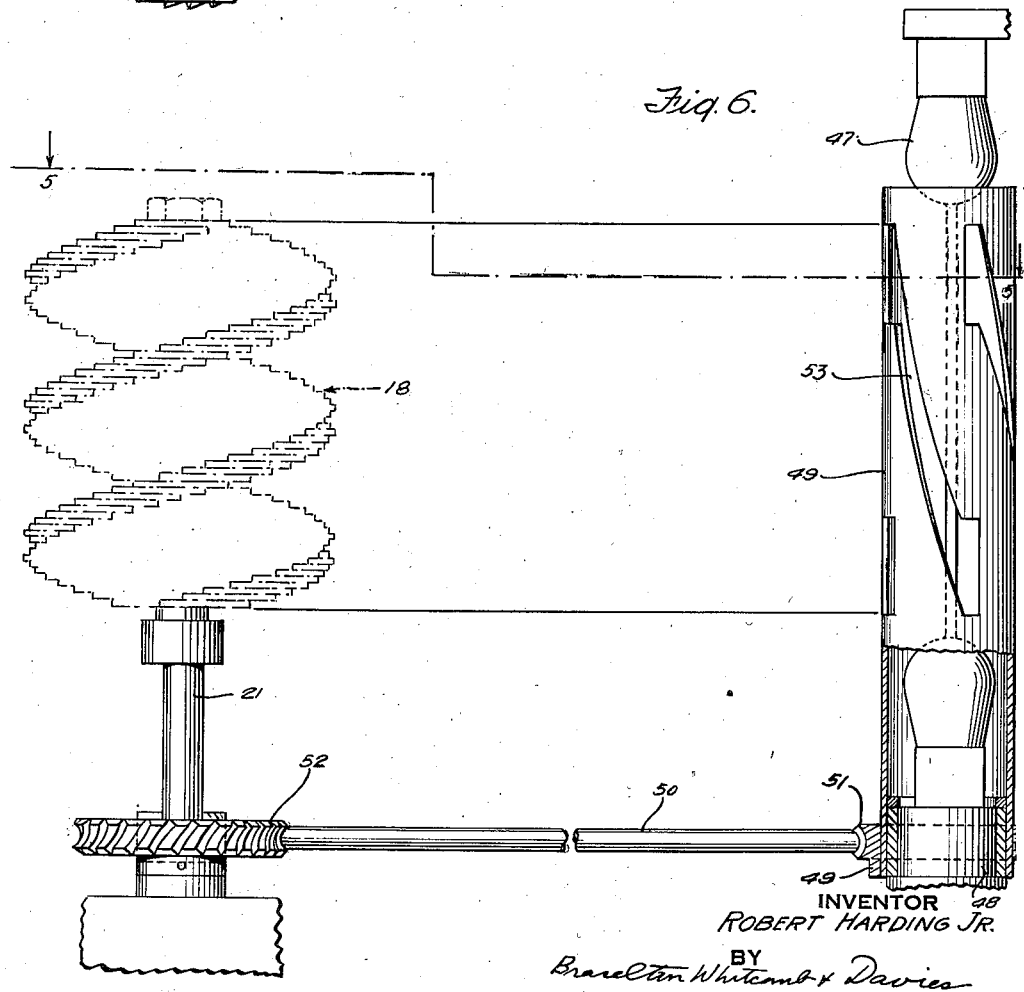
Fig. 6 is a front elevational view of the construction of Fig. 5.

In Figs. 5 and 6 another arrangement is shown for affecting this cut off of light. Here a light source 47, similar to the lamp 27, may be mounted in a suitable socket 48 while a shutter cylinder 49 surrounds the lamp. This cylinder is mounted in a rotatable member 49 and may be driven from the drum shaft 21 by a gear train similar to that already described or, if desired, by the belt 50 which engages a pulley 51 attached to the rotatable member 49 and another pulley 52 mounted on the drum shaft 21. The cylinder is provided with slots 53 similar to those in the disc 34 and having a suitable curvature so that only a small portion of the lamp is visible from the drum at any one instant.

The slots in either the disc or the cylinder should be wide enough so that several plates may be able to pick up light. If they are made too narrow the observer will be able to see the picture with his head only in one position. Increasing the width of the openings permits him to raise and lower his head and still see the picture as each plate then picks up a different portion of the lamp through a different vertical portion of the slot. But the slots must not be wide enough so that the observer will see No. 1 plate and No. 21 plate at the same time or he will see two pictures, one vertically overlapping the other.

As has already been explained the result of the above construction gives a much brighter picture due to the fact that the light is nearer to the drum than would be the case if the drum made only one rotation per minute. It may be desired however in some instances to bring the light even closer to the drum and this may be especially true where a picture of a larger number of lines is desired. Accordingly any one of the arrangements disclosed in my copending application entitled Television system Serial No. 708,747 filed January 29, 1934 may be used.

In Fig. 7 a drum 54 is shown provided with plates 55 having curved surfaces 56 and 57. As described in the copending application above referred to the curved reflecting surfaces of the plates permit closer positioning of the lamp as indicated in the figure. A comparison of Figs. 1, 2 and 7 will show at a glance the advantage gained by increasing the angle between the plates and the additional gain produced by curving the plates. Instead of the curved plates a cylindrical lens may be used to bring the light up closer, or a concave reflecting mirror may be used, or any one or more of these devices may be used either alone or supplementing each other and all in combination with the increased angle between the plates.

While an arrangement of two reflecting surfaces per plate is shown and described, the invention is intended to cover any number of reflecting surfaces per plate, with the plates spaced in such a manner, and the speed of the drum such, that the groups of helixes so formed will scan successively, a suitable shutter being used to block out the light from those groups not being used. Thus triangular plates may be used spaced at 8° so as to make 1⅓ turns around the drum. The second set of edges will then scan the second picture and the third set the third. If these plates are spaced at 10° so that they make 1⅔ turns around the drum, then the picture is scanned by the first, third, and second set of edges in the order named.

The shutter is preferably positioned close to the lamp because the horizontal width of the light beam passing through it is smallest at the light and increases towards the drum. The shutter may, however, be placed near the drum, or between the drum and the observer, or it may be a cylinder surrounding the drum, as long as it accomplishes the purpose of blocking out light from all but the proper reflecting edges.

While the invention has been described in connection with a television receiver it will be understood that it is also applicable to television transmitting units.

Many modifications may also be made in the invention without departing from the spirit thereof and I do not therefore desire to limit myself to what has been shown and described except as such limitations occur in the appended claim.

What I claim is:

A television apparatus comprising a mirror drum having a plurality of stacked elongated rectangular plates each of said plates having its long sides polished to form reflecting surfaces and its ends treated so as to prevent reflection of light, said plates being spaced around the axis of said drum with equal angular spacing so as to form a helix which passes one and one-half times around said drum.

ROBERT HARDING, Jr.